(12) United States Patent
Hamelinck et al.

(10) Patent No.: US 8,162,494 B2
(45) Date of Patent: Apr. 24, 2012

(54) SURFACE DEFORMATION ACTUATION STRUCTURE

(75) Inventors: Roger Franciscus Mattheus Maria Hamelinck, Dongen (NL); Petrus Carolus Johannes Nicolaas Rosielle, Veldhoven (NL); Jakobus Pieter Kappelhof, Delft (NL)

(73) Assignee: Nederlandse Organisatie voor toegepast-natuurwetenschappelijk Onderzoek TNO, Delf (NL)

( * ) Notice: Subject to any disclaimer, the term of this patent is extended or adjusted under 35 U.S.C. 154(b) by 1337 days.

(21) Appl. No.: 10/578,805

(22) PCT Filed: Nov. 21, 2003

(86) PCT No.: PCT/NL03/00819
§ 371 (c)(1),
(2), (4) Date: Mar. 28, 2007

(87) PCT Pub. No.: WO2005/050283
PCT Pub. Date: Jun. 2, 2005

(65) Prior Publication Data
US 2007/0263302 A1    Nov. 15, 2007

(51) Int. Cl.
*G02B 7/188* (2006.01)
*G02B 26/08* (2006.01)
(52) U.S. Cl. ........ 359/849; 359/846; 359/847; 359/848; 359/224.1; 359/290; 359/291; 359/903; 359/904
(58) Field of Classification Search .................. 257/415, 257/421, 426, 798; 359/846–849, 871, 872, 359/875, 904, 224.1, 290, 291, 903
See application file for complete search history.

(56) References Cited

U.S. PATENT DOCUMENTS
3,453,041 A    7/1969   Rantsch
(Continued)

FOREIGN PATENT DOCUMENTS
EP    0744641 A    11/1996
(Continued)

OTHER PUBLICATIONS

Yang, Eui-Hyeok, "A Wafer-Scale Membrane Transfer Process for the Fabrication of Optical Quality, Large Continuous Membranes", Journal of Microelectromechanical Systems, vol. 12, No. 6, Dec. 2003, pp. 804-815.*

(Continued)

*Primary Examiner* — Jerome Jackson, Jr.
*Assistant Examiner* — Yu Chen
(74) *Attorney, Agent, or Firm* — Leydig, Voit & Mayer Ltd.

(57) ABSTRACT

A structure such as an electronically deformable mirror contains a deformable membrane, an array of actuators located facing the membrane, each actuator being arranged to actuate local displacement of the membrane perpendicular to its surface. The actuators and the membrane are connected via an array of actuating connections. The actuating connections substantially transmit movement perpendicular to the second surface, but leave planar displacement and/or local rotation of the second surface substantially free. Preferably, the actuators contain an array of soft magnetic islands on a soft magnetic base plane, with actuator coils running around the islands and a system of sort magnetic walls on the base plane to separate the coils. The walls support a soft magnetic resilient surface that extend over of the islands and serve to drive the actuating connections. Preferably the base plane is supported on an array of rod shaped connection elements, leaving space to permit air to circulate between the support structures and the support plate.

7 Claims, 2 Drawing Sheets

U.S. PATENT DOCUMENTS

| | | | |
|---|---|---|---|
| 3,459,126 | A | 8/1969 | Nyman |
| 3,644,022 | A | 2/1972 | Jagdt et al. |
| 4,143,946 | A | 3/1979 | Leo et al. |
| 5,037,184 | A | 8/1991 | Ealey |
| 5,204,784 | A | 4/1993 | Spinhirne |
| 5,774,252 | A * | 6/1998 | Lin et al. .................... 359/224.1 |
| 5,831,780 | A | 11/1998 | Krim |
| 5,867,302 | A * | 2/1999 | Fleming ........................ 359/291 |
| 6,293,680 | B1 | 9/2001 | Bruns |
| 6,384,952 | B1 * | 5/2002 | Clark et al. ................ 359/224.1 |
| 7,268,081 | B2 * | 9/2007 | Yang ............................. 438/694 |
| 2003/0214734 | A1 | 11/2003 | Nishioka et al. |

FOREIGN PATENT DOCUMENTS

| | | | |
|---|---|---|---|
| GB | 309236 A | 4/1929 | |
| WO | WO 01/29586 A | 4/2001 | |

OTHER PUBLICATIONS

Divoux et al., "Deformable Mirror using Magnetic Membranes: Application to Adaptive Optics in Astrophysics", IEEE Transactions on Magnetics, vol. 34, No. 5, Sep. 1998, pp. 3564-3567.*

Teter et al., "Precision cryogenic magnetostrictive actuator using a persistent high TC magnet", Journal of Applied Physics, vol. 87, No. 9, May 2000, pp. 6313-6315.*

Bifano et al., "Surface Micromachined Deformable Mirrors", Conference on Emerging Technologies and Factory Automation (1996), vol. 2, pp. 393-399.*

International Search Report.

International Preliminary Examination Report.

* cited by examiner

SURFACE DEFORMATION ACTUATION STRUCTURE

FIELD OF THE INVENTION

The invention relates to a surface deformation actuation structure, in particular for a deformable mirror, an actuator array useful for such a surface deformation actuation structure and a support structure useful for such a surface deformation actuation structure.

BACKGROUND

Deformable mirrors are used in optical applications to reshape optical wave fronts, for example to compensate for atmospheric turbulence. For this purpose it is necessary to impose and/or constrain deformations of a reflective surface with high spatial frequencies.

In order to impose and control these deformations an array of actuators is used. It should be possible to exert accurate control over the displacements of the different regions with a high bandwidth independently in small regions that together cover over a large surface. Current deformable mirrors have unsatisfactory bandwidth, resolution and size. It is often impossible to control displacement with sufficient accuracy.

For satisfactory use it may also be necessary to place further demands on the capability of deforming the surface, for example regarding speed, maximum possible amplitude of the deformations (e.g. of a point deformation), low coupling between actuators, high density, scalability, low friction, hysteresis and play, high reproducibility etc. Similar demands may be placed on actuator structures for deforming surface in general, not only for reflective surfaces.

SUMMARY OF THE INVENTION

Among others it is an object of the invention to provide for an actuation structure for deforming a surface of large size with high bandwidth, and resolution.

Among others it is an object of the invention to provide for an actuation structure for deforming a surface with an array of actuators with small interaction between the effects of different actuators.

Among others it is an object of the invention to provide for an actuation structure for deforming a surface in which actuation involves little or no friction, hysteresis and/or play.

Among others it is an object of the invention to provide for an actuation structure for deforming a surface that can be actuated with a high bandwidth.

Among others it is an object of the invention to provide for an actuator array for providing individually controllable displacements at a two-dimensional array of positions, with a high actuator density.

Among others it is an object of the invention to provide for an actuator array that has low power dissipation.

Among others it is an object of the invention to provide for an actuator array that is easily extendable from small diameter surfaces (order of millimeters) to larger diameter surfaces (order of hundreds of millimeters).

Among others it is an object of the invention to provide for an array of actuators for providing individually controllable displacements at a two-dimensional array of positions, which actuators are of simple design and cause little or no friction, hysteresis and/or play.

Among others it is an object of the invention to provide for a support reference surface for an array of actuators with a minimum of shape deformation due to heating.

Among others it is an object of the invention to provide for a support reference surface for a heat generating structure, so that the surface suffers a minimum of shape deformation due to heating and temperature changes of the environment.

The invention provides for a surface deformation actuation structure according to claim 1. The invention makes use of a membrane and a preferably two-dimensional array of actuators that are connected to the membrane via an array of actuating connections that are stiff in one direction, perpendicular to the plane of the membrane and flexible in the other directions to an extent that they cause or oppose local rotation of the membrane to a substantially smaller extent (e.g. at least 10%) than if the actuating connections would be as stiff in the other directions as in said one direction. These connection elements are more flexible in transverse directions than in said one direction; as a result, differences between thermal expansion of the deformable membrane and the actuator array cause a minimum of undesired shape deformation.

In the case of a deformable mirror, the surface of the membrane opposite the surface where the actuating connections are connected is an optical mirror surface.

When an actuating connection displaces part of the membrane perpendicularly to the plane of the membrane, the membrane will exhibit local bending in that area. Because of the flexibility of the neighbouring actuating connections this bending is not opposed. Also, the flexibility prevents significant torsion forces from developing on the attachments of the actuating connections to the membrane. The actuator connection is free from play, friction and hysteresis. This improves the accuracy with which the shape of the membrane can be controlled.

The actuating connections are preferably shaped as thin rods, with a much greater length than width, for example at least ten times as long as the width. In an example, metal rods with a diameter of 50 micrometer and a length of 0.7 millimeters are used. However, other types of actuating connections may be used to realize a difference in stiffness for movement perpendicular to the membrane on one hand and bending on the other. e.g. combinations of constructive elements, wherein different constructive elements are used to provide flexibility for different deformations, suitable elements are for example leaf springs.

According to another aspect of the invention a preferably two-dimensional array of electromagnetic actuators is realised with actuator cells that contain islands extending from the surface of a base plate and actuator coils running around respective islands. A system of walls is used to substantially divide a surface of the base plate into separate cells, each containing a respective one of the islands and coils. Resilient surface parts rest on the walls and extend to the islands, leaving an air gap between the surface parts and the top of the islands (although the conventional word "air" gap is used, it should be understood that this term does not exclude that the gap may be in a vacuum or may contain a different gas).

The base plate, islands, walls and surface parts are soft magnetic, so that current through the coil changes their magnetization, and exerts a force that displaces the part of the resilient surface over the island. This part is used as actuating surface to generate a local displacement. The walls separate the cells, thus minimizing interaction between the cells, which simplifies accurate control over the displacements of the actuator array. Preferably, permanent magnets are provided on top of the islands to provide a well-defined state of the actuator cells at zero current through the coils.

According to another aspect of the invention the array of actuators is supported on a stiff support structure with a gap between the support structure and the back of the array of actuators, so that the gap permits the circulation of air (or any other gas or liquid) to carry off heat generated in the actuator array. Connection elements are provided in the gap between the back of the actuator array and the support structure. These connection elements are stiff in the direction perpendicular to the supported plane of the actuator array, but more flexible in transverse directions, preferably in all other degrees of freedom (DOF's). As a result, differences between thermal expansion of the support structure and the actuator array cause a minimum of deformation of the shape of the actuator array.

Preferably the support structure is a honeycomb structure with a two dimensional array of cells, the array extending parallel to the back plane of the actuator array. In this case, the connection elements are preferably connected to junctions between the different wall segments of the cells. Preferably, the honeycomb structure is arranged to permit the circulation of air (or any other gas or liquid) through the cells of the honeycomb to and/or from the back plane of the array of actuators. In this case, preferably, the walls of the cells of the honeycomb structure that define the geometrical structure of the honeycomb are provided with isolation material that does not define the geometrical structure, but prevents the walls from heating unevenly. Thus, deformation of the support structure due to uneven heating is avoided.

DETAILED DESCRIPTION OF THE DRAWINGS

Figure 1:
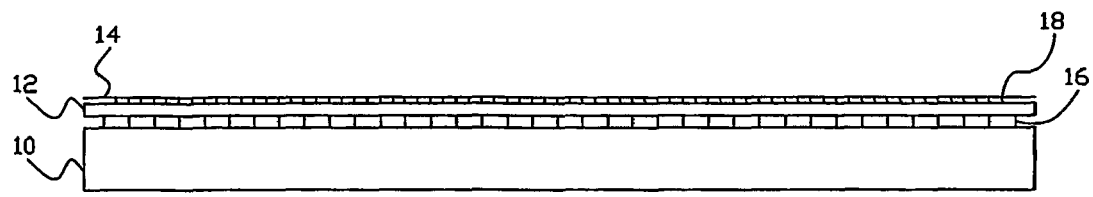
FIG. 1 shows an adaptively deformable mirror structure in side view

FIG. 1 shows an adaptively deformable mirror structure (not to scale). The structure contains a support structure 10, an actuator structure 12 and a deformable mirror 14. Actuator structure 12 is attached to support structure 10 via connecting elements 16. Deformable mirror 14 is attached to actuator structure 12 via actuating connections 18 (the number of connecting elements 16 and actuating connections has been selected for the sake of clarity and does not correspond to actual numbers).

Figure 2:
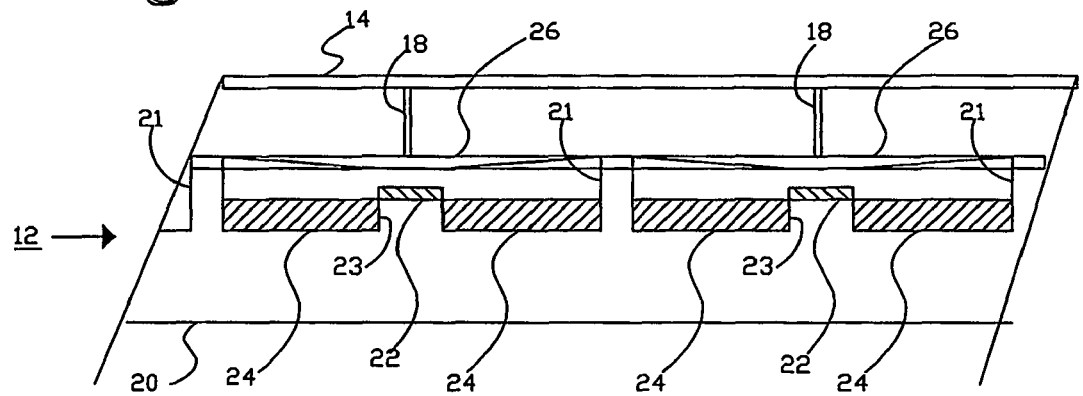
FIG. 2 shows a side view of part of an actuator array
Figure 3:
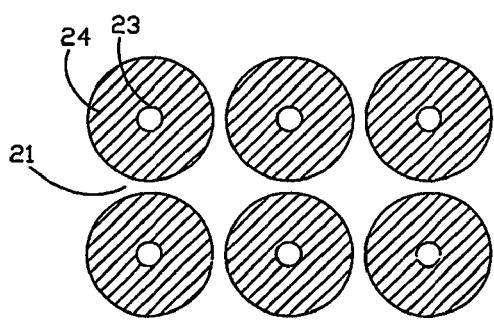
FIG. 3 shows a top view of part of an actuator array

FIG. 2 shows a side view of a part of actuator structure 12 and deformable mirror 14. FIG. 3 shows a top view of part of actuator structure 12. Actuator structure 12 contains a magnetically permeable base plate 20. Base plate 20 contains recesses bounded by walls 21. In the centres of the recesses base plate contains islands 23. Coils 24 are provided in the recesses, with windings that run around islands 23. On top of the islands permanent magnets 22 are provided. A magnetically permeable membrane 26 rests on walls 21 and extends over the recesses and the islands.

The actuator structure contains an array of recesses, each with a magnet 22, coil 24 etc. The combination of a recess, magnet 22, coil 24, island 23 and surrounding wall 21 will be called an actuator cell. Although a rectangular array has been shown, the array may have any form e.g. a hexagonal array etc. The coils of the array are connected to a control circuit (not shown) so that the currents through the coils can be controlled independently of one another. It will be realized that the simple structure of the individual cells makes it possible to realize a high density of actuators.

Deformable mirror 14 is connected to membrane 26 via actuating connections 18. The actuating connections are rod shaped. In a typical example deformable mirror 14 has a thickness of about 50 micrometer and may be made of metal or glass for example. In this example actuating connections 18 have a diameter of 50 micrometer and a length of 0.7 millimeters, and is made of steel. The actuating connections are connected, for example by a glued connection to both deformable mirror 14 and membrane 26, each preferably at the centre of a recess, at a position over a respective island 23. The plane of deformable mirror 14 opposite actuating connections 18 is covered with a reflective coating (not shown separately).

In operation the deformable mirror is deformed by supplying currents to coils 24 in different recesses. Different currents are selected for different coils, dependent on a desired amount of local deformation. A magnetic flux circuit runs from each magnet 22 through base plate 20, walls 21, membrane 26 and the air gap between membrane 26 and magnet 22. The magnetic flux magnetizes membrane 26, so that a local pulling force towards magnet 22 is exerted on membrane 26. As a result, due to the resilience of membrane 26, membrane 26 bends and is locally displaced towards magnet 22 in the centre of the recess. Dependent on the current through coil 24 the magnetic flux strength is increased or decreased, increasing or decreasing the amount of local displacement of membrane towards magnet 22.

The amount of displacement is substantially linearly proportional to the current through coil 24. There is little or no cross-coupling between different recesses. Displacement involves little or no friction, hysteresis or play, which simplifies accurate positioning. Little power dissipation is needed. In an example the power dissipation is a couple of milliwatts per cell.

The local displacement of membrane 26 is transmitted to deformable mirror 14 by the actuating connection 18 that is attached to the membrane and deformable mirror 14. Because actuating connection 18 is very thin it causes deformable mirror to bend locally.

Because of the thinness of actuating connection 18, actuating connection 18 only presents significant stiffness along the length of the actuating connections 18, substantially perpendicular to the plane of the membrane and is flexible in the other directions to an extent that they cause or oppose local rotation of the membrane to a substantially smaller extent than if actuating connections would present as much stiffness in the other directions as along the length. Connection elements 18 are more flexible in transverse directions; as a result, differences between thermal expansion of the deformable membrane and the actuator array cause a minimum of undesired shape deformation. As a result actuating connections 18 do not significantly affect the deformation caused by neighbouring actuating connections 18.

Furthermore, due to the lightness of the thin actuating connections 18 and the stiff coupling along the length of actuating connections 18 a high mechanical resonance frequency is realized which permits a high operating bandwidth. The connection by actuating connections 18 involves little or no play, friction or hysteresis. This makes the displacements accurately reproducible and accurately adjustable.

It should be appreciated that any actuating connection will of course have some stiffness in lateral direction in the plane of the membrane and less than infinite stiffness perpendicularly to that plane. But the stiffness perpendicular to the plane is preferably so large that it exceeds the stiffness of the membrane against deformation in that direction (preferably by so much that the membrane substantially (e.g. for at least 80%)

follows all movement of an end of the actuating connection opposite attachment to the membrane, (more preferably by at least a factor 100), whereas the stiffness of the actuating connections against lateral displacement in the plane is smaller than that of the plane for this type of displacement (preferably so much smaller that lateral displacements of the membrane are as large (e.g. for at least 80%) as they would be in the absence of any lateral stiffness of the actuating connections).

Figure 4:
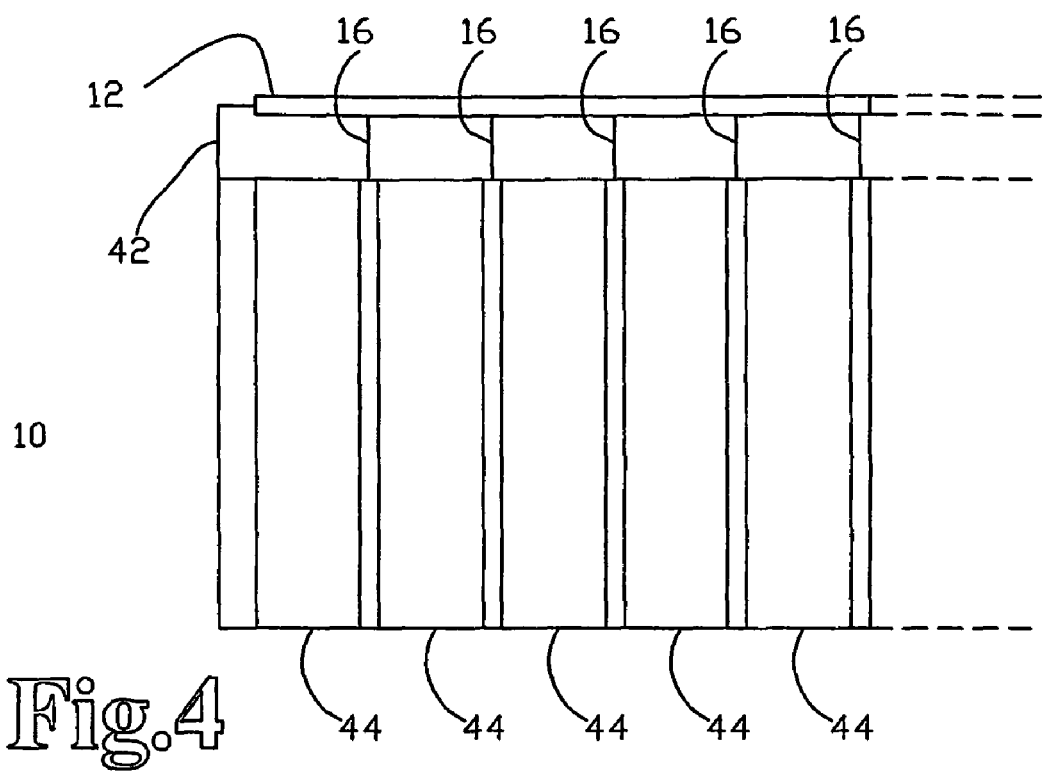
FIG. 4 shows a side view of a support structure
Figure 5:
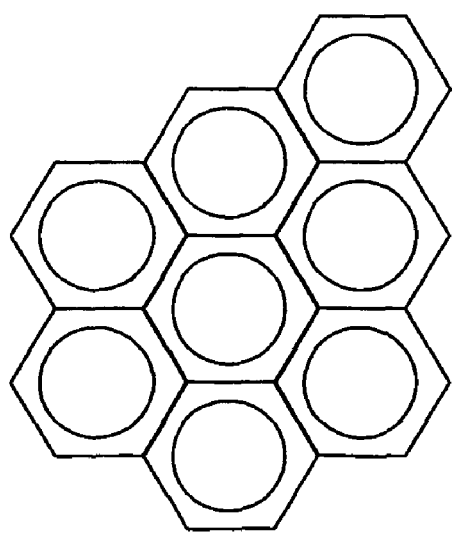
FIG. 5 shows a top view of a support structure

FIGS. 4 and 5 show a part of support structure 10 and actuator structure 12 in more detail. Support structure 10 comprises a honeycomb array of cells. Actuator structure 12 is attached to support structure 10 first of all via three tangential folded leaf springs 42 (one shown), each of which limits movement of a respective point of actuator structure in the direction of the fold of the leave spring.

Furthermore actuator structure 12 is attached to support structure 10 with an array of connection elements 16 in the form of thin rods that respond flexibly to all movement of the attached points of the actuator structure, except movement perpendicular to the plane of the support structure. Preferably, each connection element is connected to a respective cross point of walls of the honeycomb structure. The connection elements serve to define the distance between the back plane of actuator structure 12 and support structure 10.

The spacing between the back plane of actuator structure 12 and support structure 10 allows air to circulate between actuator structure 12 and support structure, whereby heat generated in actuator structure 12 can be removed without directly heating support structure 10. In an embodiment, which is intended for applications where the plane of actuator structure is placed horizontally with respect to gravity, thermal isolation material is provided on the walls of the cells 44 of the honeycomb. In this embodiment the honeycomb structure has openings, to allow air to circulate to and from the back plane of the actuator structure 12 through respective ones of the cells 44 of the honeycomb structure.

The honeycomb structure ensures a lightweight and stiff support. By providing air to circulate between actuator structure 12 and support structure, it is prevented that support structure 10 heats unevenly due to heat generated by the actuators, which prevents uneven deformations of the support structure. The array of connection elements 16 between support structure 10 and the actuator structure 12 ensures that the back plane of the actuator array is kept at a well defined fixed distance from the surface of support structure 10, while permitting relative lateral displacement between support structure 10 and the actuator structure 12 to prevent undulations of the back plane of actuator structure 12 due to discrepancies in lateral expansion.

Preferably, by using isolation material in the cells heat can be carried away through the openings between the walls of the honeycomb structure without causing uneven heating.

The various aspects of the invention have been described for a deformable mirror arrangement. In such an arrangement the invention provides for an accurately controllable mirror arrangement with a minimum of undesired deformation. Deformation due to cross coupling between actuator cells is minimized by using an array of flexible rod shaped actuator connections between the deformable mirror 14 and the actuators, and by using magnetically operating actuators in cells with magnetically permeable walls. The actuator array defines a flat surface without deformation because it is supported by an array of support elements 16 that accurately define the distance between the back plane of actuator structure 12 without fixing their relative lateral position.

Although the effect of the various aspects on a deformable mirror has been described, it should be realized that the various aspect each are useful on their own, and may be used in applications other than deformable mirrors. Thus, for example, the combination of a stiff support structure 10 and a planar surface with an array of connection elements that define the distance but do not significantly limit lateral displacement is useful under any circumstance where heat is generated in or near one of the structures. Similarly, an array of magnetic actuators that is realized in cells with magnetically permeable walls may be used to actuate other objects than deformable mirrors and on other types of support structure. Also similarly, the use of actuating connections 18 that flex in all but the actuation direction and connect actuators and a deformable surface is not limited to deformable mirrors, magnetic actuators or any specific support structure.

The invention claimed is:

1. A surface deformation actuation structure, comprising:
    a deformable membrane that has a first surface and a second surface opposite said first surface;
    an array of actuators located facing the second surface, each actuator having an actuating surface, each actuator being arranged to actuate displacement of the actuating surface substantially perpendicularly to the second surface; and
    an array of actuating connections, each coupled to the actuating surface of a respective one of the actuators in the array and a respective point of the second surface substantially opposite the actuating surface, each actuating connection having anisotropic stiffness, substantially transmitting movement perpendicular to the second surface and leaving planar displacement and/or local rotation of the second surface substantially free, wherein the array of actuators comprises:
    a variably magnetizable base plate,
    an array of variably magnetizable islands on said base plate,
    actuator coils, each running around a respective one of the islands,
    a system of variably magnetizable walls on the base plate, the walls dividing a surface of the base plate into separate cells, each containing a respective one of the islands and coils, and
    a variably magnetizable resilient surface, with surface parts that each rest on at least one of the walls of respective cells, extend over a respective one of the islands and contain a respective one of the actuating surfaces.

2. The surface deformation actuation structure according to claim 1, comprising permanent magnets placed on top of the islands.

3. The surface deformation actuation structure according to claim 1 further comprising:
    a support structure, and
    an array of rod shaped connection elements connecting the support structure and base plate, the array of rod shaped connection elements forming a space to permit air to circulate between the support structure and the base plate, each connection element having anisotropic stiffness, thereby substantially limiting a maximum distance between the base plate and the support structure to a predetermined value, while permitting transverse relative movement between the support structure and the base plate.

4. The surface deformation actuation structure according to claim 3, wherein the support structure comprises a honeycomb structure with cells that extend perpendicular to the base plate, and wall segments surrounding the cells at least in planes perpendicular to the base plate, the connection elements connecting junctions of wall segments to the base plate.

5. The surface deformation actuation structure according to claim 4, comprising thermal isolation material between the wall segments and inner spaces of the cells, the cells being open to permit air circulation from and/or to the base plate through the cells.

6. The surface deformation actuation structure according to claim 1, wherein the first surface is an optical mirror surface.

7. The surface deformation actuation structure according to claim 1, wherein each actuation connection is rod shaped and at least ten times longer perpendicular to the second surface than wide.

* * * * *